United States Patent [19]
Baudhuin

[11] 3,821,431
[45] June 28, 1974

[54] CHERRY PIT FLOUR CONSISTING OF FINELY GROUND CHERRY HULLS AND CHERRY KERNELS

[75] Inventor: George J. Baudhuin, Sturgeon Bay, Wis.

[73] Assignee: Beatrice Foods, Co., Chicago, Ill.

[22] Filed: Mar. 26, 1971

[21] Appl. No.: 128,538

Related U.S. Application Data

[62] Division of Ser. No. 696,520, Jan. 9, 1968, Pat. No. 3,594,182.

[52] U.S. Cl. .............................................. 426/148
[51] Int. Cl. ......................... A21d 1/00, A23l 2/00
[58] Field of Search ......... 99/93, 99, 101, 126, 100, 99/103, 1, 2 E

[56] References Cited
UNITED STATES PATENTS

| | | | |
|---|---|---|---|
| 1,182,264 | 5/1916 | Fowler | 99/93 |
| 1,194,276 | 8/1916 | Constantine | 99/101 |
| 1,374,657 | 4/1921 | Hiller | 146/230 |

FOREIGN PATENTS OR APPLICATIONS

| | | | |
|---|---|---|---|
| 4,150 | 0/1903 | Great Britain | 99/93 |
| 106,142 | 0/1917 | Great Britain | 99/93 |

OTHER PUBLICATIONS

U.S. Dept. Agr. Bull, 350 "Utilization of Cherry by Products" F. Rabak, 1916.

Primary Examiner—Wilbur L. Bascomb, Jr.
Assistant Examiner—Martin G. Mullen
Attorney, Agent, or Firm—Morsbach, Pillote & Muir

[57] ABSTRACT

Drying cherry pits and removing any residue of cherry flesh therefrom. Sizing the cherry pits into generally uniform sizes, cracking with controlled pressure so that the portion of the cherry hull adjacent the line of separation is cracked into pieces and the remainder into smaller pieces, and removing the larger pieces of the cherry hull from the mixture. Grinding a mixture of the cherry kernels and cherry hulls to make an edible cherry pit flour.

1 Claim, 6 Drawing Figures

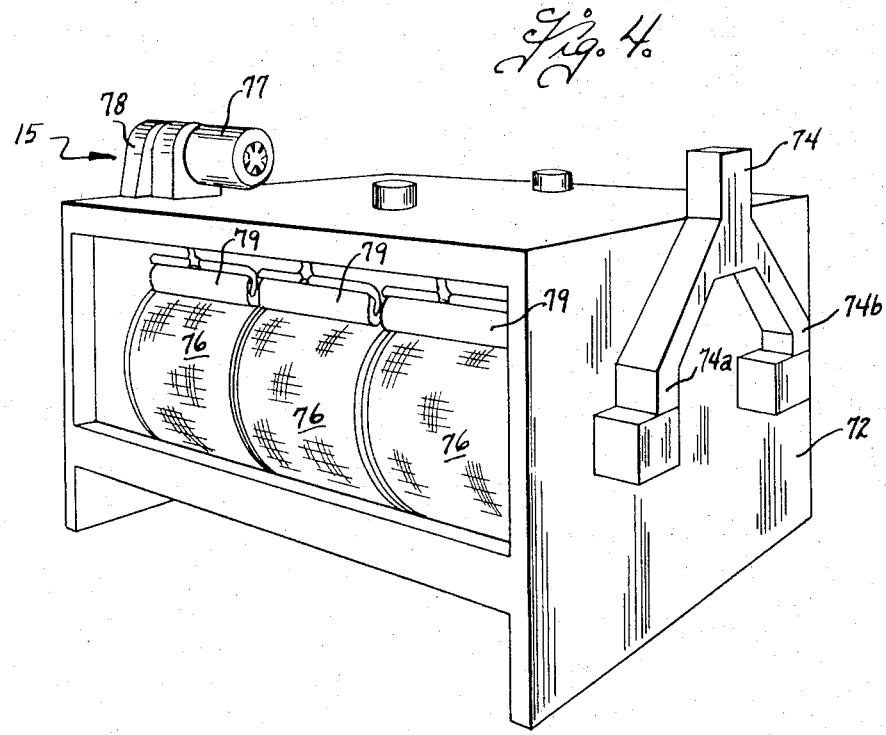
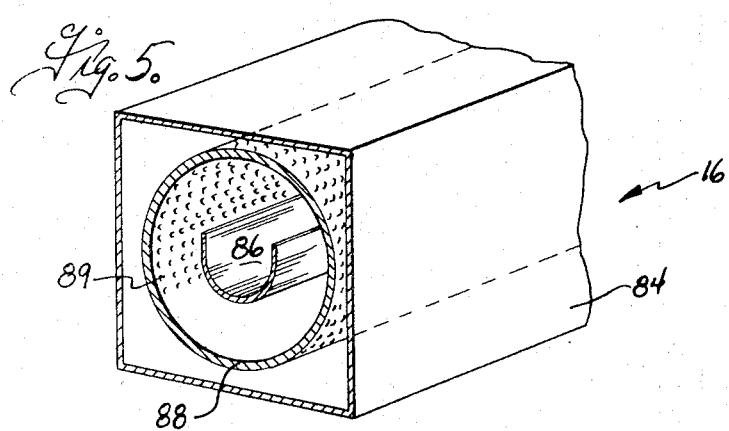
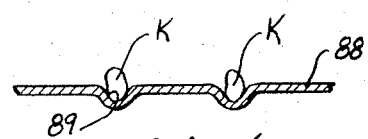

3,821,431

CHERRY PIT FLOUR CONSISTING OF FINELY GROUND CHERRY HULLS AND CHERRY KERNELS

CROSS-REFERENCE:

This is a division of application Ser. No. 696,520, filed Jan. 9, 1968, now U.S. Pat. No. 3,594,182.

Background:

This invention pertains generally to cherry pits and more particularly to a method of processing cherry pits and an edible flour made therefrom.

Processing of cherries in the United States and Canada averages over 445 million pounds annually. About 22 million pounds (dry weight) of cherry pits are discarded annually and are not presently utilized to provide a product of economic value to the canners or growers. Prior investigations have been made to determine the composition of the cherry pit and usable products which can be made therefrom. As a result of these investigations, it is known that cherry pits have a high protein content and that the cherry kernels have high oil content. However, to date there has been no economic or commercial method of processing the cherry pits, and they are still being discarded.

Cherry pits have several characteristics which makes their processing difficult. First of all, the cherry pits are very small, yet the size varies, which may be due to any of numerous different factors which affect growth. After pitting from the cherry, a certain amount of cherry flesh remains on the cherry kernel. Within a short period of time, this flesh can spoil and cause the cherry pits to sour or discolor. Thus, the cherry pits are perishable and must be processed to a certain extent a short time after pitting. This requirement is aggravated by the fact that the cherries will ripen and be harvested in about a two week period in any given area.

SUMMARY:

This invention relates to a new and useful method of processing cherry pits and to an edible flour made from the cherry pits.

It is a general object of the present invention to utilize cherry pits which have previously been discarded.

It is another object to provide a method for processing cherry pits to provide products of economic value therefrom.

Another object of the present invention is to provide a new cherry pit flour for use in comestibles.

These, and other objects and advantages of the present invention, will become apparent as the same becomes better understood from reference to the drawings and the following detailed description.

DRAWING:

FIG. 4 is an enlarged perspective view of the first separating apparatus shown in FIG. 1 and having the front panel removed for better illustration;

FIG. 5 is an enlarged perspective diagrammatic view of the second separating apparatus shown in FIG. 1; and FIG. 6 is a fragmentary longitudinal cross-sectional view of the outer drum illustrated in FIG. 5, and on a larger scale.

DESCRIPTION

In general, the method of the present invention includes drying cherry pits and removing any residue of cherry flesh therefrom. The cherry pits are then stored until time for further processing. Either before or after the preceding steps, but before cracking, the cherry pits are sized into generally uniform sizes. After drying and sizing, the cherry pits are cracked with controlled pressure so that the portion of the cherry hull adjacent its line of separation is cracked into generally large pieces, and the remainder of the cherry hull is cracked into smaller pieces. In general, the pressure is controlled so that a maximum percentage of the cherry kernels remain intact. The larger pieces of the cherry hull are then preferably removed from the mixture of cherry kernels and cherry hulls. The remaining mixture may then be ground into an edible cherry pit flour, as hereafter described. If desired, the remaining mixture may advantageously be further processed to separate the whole cherry kernels from the mixture, and the fragments of cherry kernels from the remaining portions of the cherry hulls.

Figure 1:
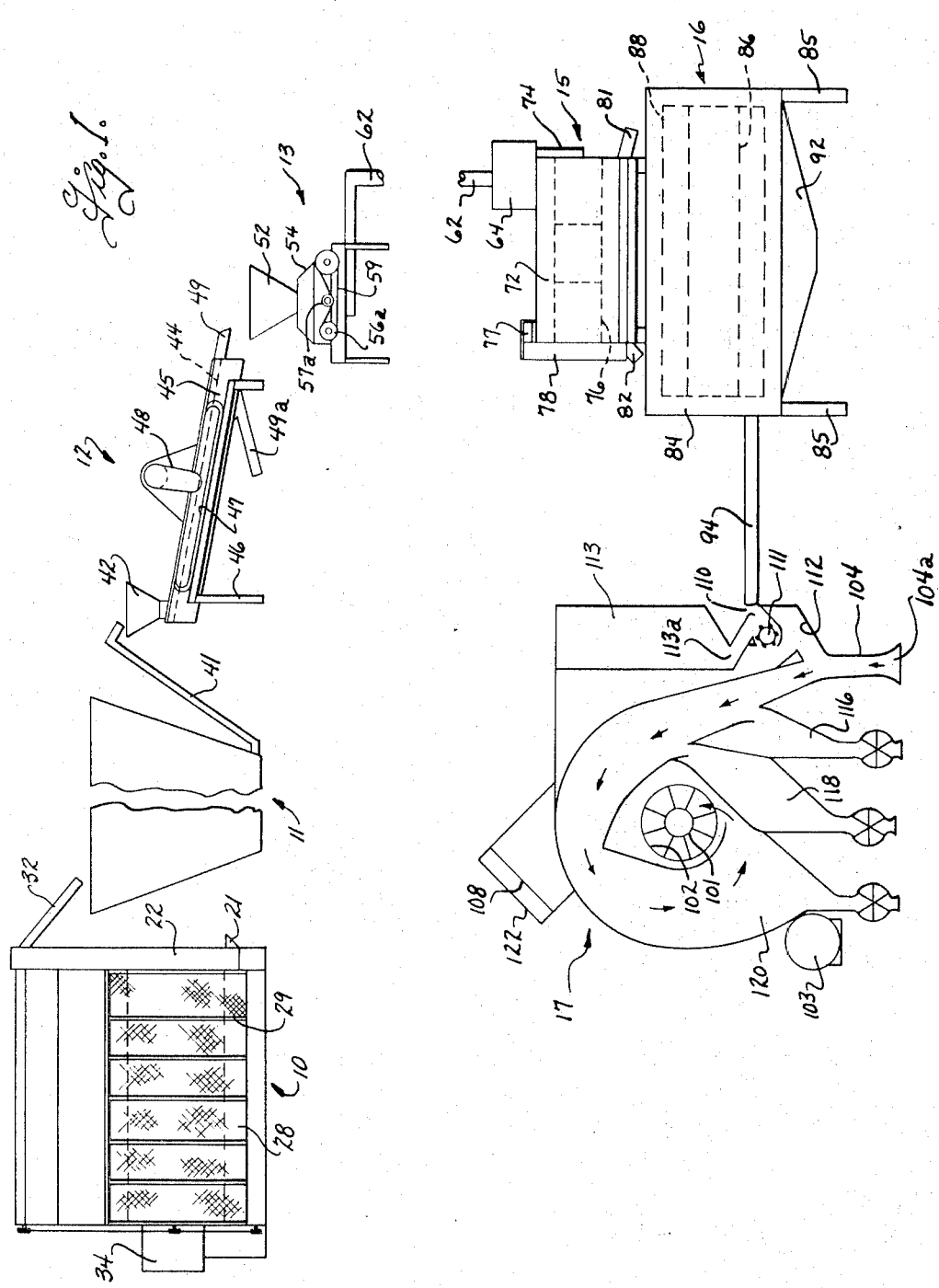
FIG. 1 is a diagrammatic illustration of one apparatus capable of performing the method of the present invention.

One apparatus capable of performing the process of the present invention is diagrammatically shown in FIG. 1. As illustrated, a drying apparatus 10 is provided for drying the cherry pits. The dried cherry pits are then transferred to a storage bin 11 which may be adjacent, or remote from, the drying apparatus 10. It is deemed obvious that the storage bin may be of any convenient size or shape. When desired, the dried cherry pits are fed from the storage bin 11 to a sizing apparatus 12. As shown, the cherry pits are divided into two sizes; however, as hereafter described, additional divisions are sometimes preferable, depending on the gradation of the cherry pits. The larger size is fed to a cracking apparatus 13; while the smaller size may be fed to a similar cracking apparatus (not shown) or stored for later processing, if desired. The cherry pits are carefully cracked so that a maximum percentage of the cherry kernels remain intact. After cracking, the mixture is fed to a first separator 15 where the pieces of cherry hulls larger than the cherry kernels are removed; and from there to a second apparatus 16 where the whole cherry kernels are removed. The whole cherry kernels are then fed to a third separator 17 where the cherry kernels are separated or classified and any chaff and the like is separated out.

As described above, the cherries will usually ripen and be harvested in about a two-week period in a given area. Processing of the cherries by the canner generally includes pitting the cherries to separate the cherry pits from the flesh. As a result of the pitting operation, the entire year's supply of cherry pits likewise becomes available in about a two week period. Since it is uneconomical to completely process all of the cherry pits immediately upon becoming available, it is preferable to store the pits. Prior to storing the cherry pits, they must be dried sufficiently; otherwise, the cherry pits may mold. It has also been found that drying of the cherry pits must be commenced within a couple of days of the pitting operation, or else the cherry pits start to sour and discolor. Preferably, the drying operation should be completed by the end of the day following the pitting operation and preferably within 24 hours thereof. It has been found that the percentage of moisture must be reduced to a level not exceeding about eleven per cent to prevent the aforementioned molding, souring, or discoloring. If dried too much, however, the cherry pits tend to split open, and the kernel deteriorates. It has been found that the cherry pits should be dried to not less than about 8 per cent to prevent such splitting.

As stated above, when the cherry pits are pitted, a certain amount of the flesh remains as a residue on the surface of at least some of the cherry pits. This residue can spoil with resulting deterioration of the cherry pits. Thus, it has been found desirable to remove any such residue. As hereafter described, this is advantageously accomplished simultaneously with drying the cherry pits. After the cherry pits are properly dried, and after any residue of the flesh is removed, they may be stored with assurance that they will not deteriorate.

Figure 2:
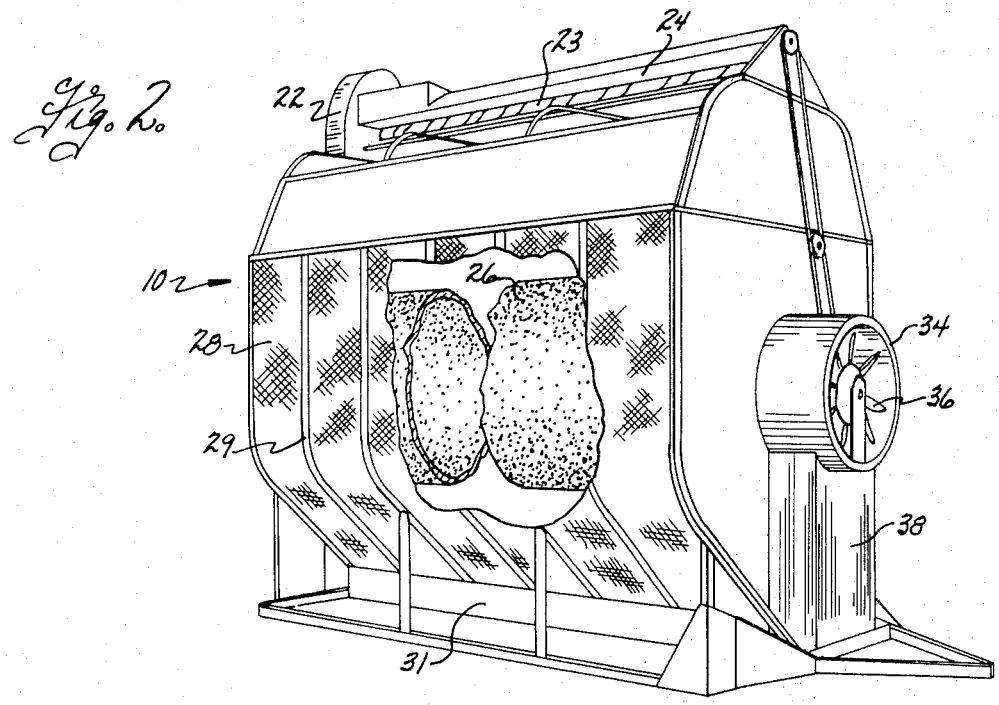
FIG. 2 is a perspective view, on a larger scale, of the drying apparatus shown in FIG. 1 and having portions broken away for better illustration.

During the drying operation, it is preferable that the cherry pits be moved or agitated so that the drying is generally uniform throughout the mass. The movement or agitation may be accomplished by circulation or recirculation of the cherry pits. One suitable drying apparatus 10 is illustrated in FIGS. 1 and 2. After the pitting operation, the cherry pits may be transported to the drying apparatus 10 in any convenient manner and discharged into an inlet chute 21. The illustrated apparatus, for example, is capable of receiving and drying about 500 bushels of cherry pits. From the chute 21, a vertical drag-type conveyor 22 transports the cherry pits to the top of the apparatus. An upper horizontal auger 23 distributes the cherry pits through an adjustable opening provided by gate 24. The opening is selected so that the cherry pits are generally uniformly distributed throughout the length of the body of the dryer apparatus. Disposed in the body is a perforated inner wall 26 which is shown as cylindrically shaped. Perforated outer walls are also provided and are shown in the form of a plurality of screens 28 supported by structural members or ribs 29. The cherry pits move downwardly between the inner wall 26 and the outer wall 28 in a generally uniform layer. Metering rolls at the bottom (not shown) feed the cherry pits to a lower horizontal auger disposed in housing 31. The lower horizontal auger is similar in construction to the upper horizontal auger 23. The lower horizontal auger feeds the cherry pits back to the vertical conveyor 22 for recirculation. The circulation or recirculation need not be continuous. What is required is that the cherry pits be moved sufficiently for a generally uniform drying.

At one end of the dryer apparatus is provided a housing 34 generally coaxial with inner wall 26. The housing contains a heating apparatus (not shown) for heating the air, and a blower 36 for blowing the heated air into the space surrounded by inner wall 26. The heated air passes through the perforatd inner wall 26, around the cherry pits, and out through the outer perforated wall 28. Another housing 38 disposed at the same end of the dryer apparatus, conveniently contains the prime mover and drive mechanism for the blower and conveyors. Advantageously, the air is heated to a maximum of about 180°F. to assure that the cherry pits are not burned or scorched. If desired, the temperature may be increased somewhat at the beginning of the drying operation, when the cherry pits are wet, without adverse effects. In the apparatus shown, about 500 bushels of cherry pits can be dried to the required moisture content in about 4 or 5 hours through the use of heated air at about 180°F.

The heated air blown through the dryer apparatus removes moisture from the cherry pits while the cherry pits are circulated and recirculated through the apparatus. An important aspect is that the residue of cherry flesh is dried by the heated air. The circulation of the cherry pits causes the pits to rub on each other and on the perforated inner and outer walls, thereby causing the dried cherry flesh and any dirt on the cherry pits to be removed or to fall off the surface of the cherry pits. As the cherry flesh dries, it shrivels into very small particles which are carried by the blown air through the outer perforated wall 28 and out of the dryer apparatus. Thus, the circulation feature is important in the initial drying of the cherry pits since it aids in the simultaneous removal of the cherry flesh. Additionally, the recirculation permits uniform drying of the cherry pits so that they may be dried within the range defined above. During the drying operation, typical specimens are periodically selected and tested for moisture content to determine when the cherry pits have been dried to the desired range.

After drying, the lower horizontal auger feeds the cherry pits to the vertical elevator 22 for discharge through a chute 32 into the storage bin 11. To hold any substantial quantity of cherry pits, it is obvious that the proportionate size of storage bin 11 will be considerably larger than that illustrated in the drawing; indeed, a separate warehouse may be utilized, if desired.

The cherry pit is generally about half moisture. More accurately, an ordinary cherry pit may be about 42 per cent moisture with the cherry kernel generally having more than fifty per cent moisture content and the cherry hull having considerably less moisture content. When the cherry pit is dried, the cherry kernel loses a greater percentage of its weight than does the hull. As a result, the cherry kernel shrinks away from the inside of the cherry hull. When properly cracked, the whole cherry kernel may be separated from the hull. If not dried prior to cracking, however, the cherry kernel is still closely adjacent the hull and is soft and moist. Cracking under this condition crushes the cherry kernel. Thus, it is preferable in all conditions to dry the cherry pit prior to cracking.

When further processing is desired, a quantity of cherry pits is fed from the storage bin 11 as by a conveyor 41 to a hopper 42 on the sizing apparatus 12. In the embodiment illustrated, the sizing apparatus includes an inclined vibrating screen 44 mounted on a bed 45 at an angle of about 10°–15° from the horizontal. The bed is supported on a frame 46 by means of springs, herein shown as a leaf spring 47. A drive mechanism 48 is mounted on the bed 45 to provide a vibrating motion thereto. The drive mechanism consists of a shaft, bearings, rotating eccentric weights, and a motor. The hopper 42 is arranged to feed a generally uniform stream of cherry pits to the screen 44 which permits the undersized cherry pits to pass therethrough. Additional screens can be provided, if desired, to separate the cherry pits into more than two separate sizes. In general, two or three separate gradations or sizes will be sufficient to provide adequate accuracy for the cracking operation. It has been found that gradations having a size range of about 1/16 inch are suitable. The cherry pits retained on screen 44 pass to a chute 49 and from there to the cracking apparatus 13. The cherry pits which pass through the screen 44 may pass through a second chute 49a to a second cracking apparatus (not shown) set to crack the cherry pits of the smaller size. Alternately, some of the sized cherry pits may be stored, and one cracking apparatus may be reset for cracking the various size cherry pits.

In one particularly advantageous arrangement of the sizing apparatus 12, three screens are utilized. A first screen has 7/32 inch openings and the "overs" provide a large size gradation of cherry pits. A second screen receives the "unders" from the first screen, and has 5/32 inch openings. The material retained on the second screen provides a medium size gradation of cherry pits. A third screen, having openings of 1/10 inch, passes all extremely small cherry pits which, for the purpose of the present invention, may be considered as hulls since the cherry kernel therein is very small. The cherry pits retained on the third screen provide a small size gradation.

Figure 3:
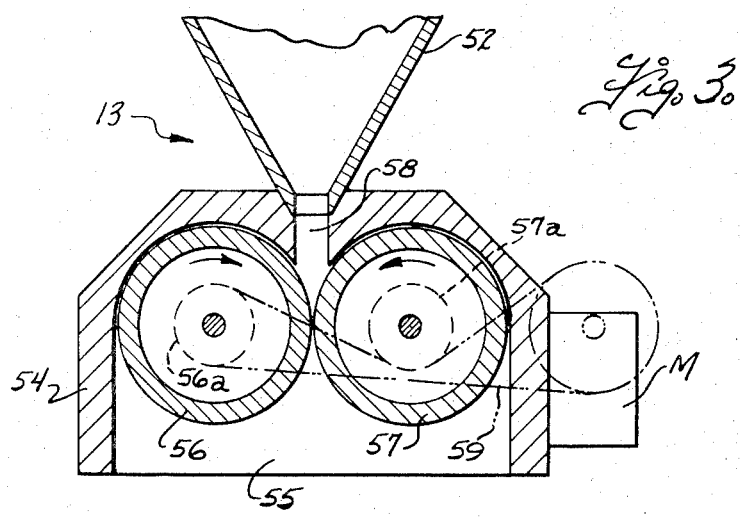
FIG. 3 is a cross-sectional view of the cracking apparatus shown in FIG. 1 and on a greatly enlarged scale.

From the chute 49 on the sizing apparatus 12, one size or gradation of cherry pits is fed to a hopper 52 on the cracking apparatus 13. As best seen in FIG. 3, one embodiment of the cracking apparatus 13 includes a housing 54 defining a generally hollow compartment 55. First and second steel rollers 56 and 57 are mounted inside the compartment 55 and are preferably adjustable so that the space between the rollers may be varied in accordance with the size of the cherry pits fed to the hopper 52. An opening 58 communicates the hopper with the compartment 55 at a point above the space between the rollers. Pulleys 56a and 57a are mounted for rotation with rollers 56 and 57, respectively, and are advantageously rotated in opposite directions by means of a belt 59 driven by a motor M. In this manner, the rollers 56 and 57 are driven in opposite directions, turning toward each other at identical speed as an aid in feeding the cherry pits received through opening 58 and cracking the same between the force of the rollers. For example, the rollers 56 and 57 are set at about 5/32 inch spacing for the above described medium gradation which are retained on the 5/32 inch screen. For the large size gradation, the rollers are advantageously set at 3/16 inch spacing which is 1/32 inch under the smallest size of this gradation. This is desirable since it assures all cherry pits of this gradation will be cracked. The undersize spacing is possible since there is more tolerance between the cherry hull and cherry kernel in the larger size cherry pits and the cherry pits can generally be passed between the rollers without damaging too many kernels. For the small size gradation, the rollers are set at about 1/8 inch spacing. Thus, the spacing of the rollers 56 and 57 is selected so that the cherry hull is cracked while the dried cherry kernel generally remains intact. In this manner, the spacing is varied so the pressure is carefully controlled to achieve the desired result.

It has been found that the cherry hull has a harder portion adjacent its natural parting line. In sizing the cherry pits in the above manner and carefully controlling the cracking of the cherry hull so that the cherry kernel is not crushed, the softer portion of the hull will crack into smaller pieces than the harder portion.

The mixture of cherry hull portions and kernels is then transported or conveyed through pipe 62 to a hopper 64 on the first separator apparatus 15. One suitable embodiment of the first separator apparatus is shown in FIG. 4, and includes a housing 72, the front panel of which is removed for better illustration of the parts. An inlet conduit 74 leads from the hopper 64 and is conveniently divided into branches 74a and 74b to feed the cherry pit mixture to two separate units in tandem for increased production. It is deemed obvious that a single unit may be utilized, if desired. In the embodiment illustrated, one unit is visible and includes a plurality of stainless steel wire screens or cages 76 into which the cherry pit mixture is fed. The cages are simultaneously rotated by motor 77 through drive mechanism 78. The cages are imparted with a gentle rolling action which brings the particles of the mixture quickly into contact with the screen. Internal lifter bars (not shown) may be provided to feed the mixture to the screen throughout its periphery to provide 180° usage of the screen. A plurality of resilient rubber rollers 79, one for each cylindrical cage 76 are located at the top of the cages so that particles stuck in the openings can be pushed back into the cage. In this manner, the apparatus is self-cleaning. The size of the screen is selected so that the cherry kernels pass therethrough along with any portions of the cherry hull the size of the kernel or smaller, thereby leaving the larger portions of the cherry hull retained on the screen. These larger portions are discharged through outlet 81 (See FIG. 1) while the cherry kernels and other portions which pass the screen are discharged through outlet 82 and into second separator apparatus 16.

The second separator apparatus includes a housing 84 supported on legs 85. As shown in FIG. 1, the second separator apparatus 16 may be utilized to support the first separator apparatus 15, if desired. Inside the housing 84 is located a generally U-shaped elongate trough 86 which is surrounded by an indent cylinder 88 (See FIG. 5). The indent cylinder 88 is rotated in any convenient manner and has a plurality of indentations 89 throughout its inner surface. As best shown in FIG. 6, the indentations 89 are sized so as to closely receive the cherry kernel K. As the cylinder is rotated, the cherry kernels K will become lodged in the indentations 89. The speed of rotation of the cylinder 88 is selected so that, as the cherry kernels approach the top of the revolution, they fall into the trough 86. The remainder of the mixture, which now includes small portions of the cherry hull and fragments of the cherry kernel, slides back down the wall. The indent cylinder 88 is advantageously inclined so that the remaining mixture is gravity fed to one end thereof and into a chute 92. This remaining mixture is discharged from the second separator apparatus 16 through the chute 92 adjacent the bottom. The whole cherry kernels K which have fallen into the trough 86, along with any other particles which may have fallen into the trough, are passed by a conveyor 94 to the third separator apparatus 17. The trough 86 is inclined toward the conveyor 94 and a vibrator (not shown) shakes the trough to feed the kernels onto the conveyor.

The third separator apparatus 17 serves to separate the whole cherry kernels K from any extraneous materials or hulls which may remain therewith. While not always necessary, the third separator apparatus 17 provides a final cleaning of the whole cherry kernels. One embodiment of the third separator apparatus 17 is diagrammatically illustrated in FIG. 1. As shown, a fan 101 is located in a central housing 102 and is conveniently driven by motor 103. The fan draws air from an inlet chamber 104 through the central housing to a discharge outlet 108. An opening is provided for receiving the mixture of whole kernels and extraneous material from conveyor 94. A rubber covered roll 111 is provided adjacent opening 110 to provide uniform infeed of said mixture to chute 112 leading to inlet chamber 104. Alternately, the mixture may be fed to hopper 113 disposed above roll 111 and having a discharge opening 113a leading thereto. The velocity of the air may be selected to divide said mixture into five separations according to weight. The apparatus is so arranged that the air stream is expanded as it is drawn therethrough. This changes the velocity of the air and separates said mixture according to weight. Since the mixture is mainly particles of generally uniform size, the heavier particles will be the more dense kernels. A first separation occurs in inlet chamber 104 where the heaviest particles fall through an opening 104a. Chambers 116 and 118 are provided for receiving the intermediate weight particles as they drop from the air stream. In last chamber 120, the air stream receives its maximum expansion prior to entry into central housing 102. The lightest items of the mixture, including any hulls, are deposited in chamber 120. Any dust or small chaff is carried to the outlet 108 and a filter 122 may be provided to collect the same, if desired.

As stated above, it has been found that the hull of the cherry pit has a harder portion adjacent the natural parting line of the hull. In sizing the cherry pits in the above manner and carefully controlling the cracking of the hull so that the kernel is not crushed, the softer portion of the hull will crack into smaller pieces than the harder portion. By cracking in this manner, the shell is cracked into pieces having sizes correlative with hardness. Thus, the harder portions of the hull, comprising about 30% of the total hull, can be removed by the first separator apparatus 15. The whole cherry kernels may be removed by the second separator apparatus 16. The remaining mixture, which is discharged through chute 92, contains the softer hull portions and fragments of the cherry kernels. These are relatively difficult to separate. It has been discovered that, by simultaneously grinding this remaining mixture of cherry kernels and cherry hulls, an edible flour can be produced. Preferably, the quantity of cherry hulls in the mixture must be sufficient to result in a dry flour which can be handled in the same manner as ordinary cereal flour. In other words, the quantity of cherry hulls must be sufficient to disperse the oil in the cherry kernel and provide agglomerated particles substantially without cohesion between the particles. While it is not known exactly how a dry flour can result from finely grinding of cherry kernels containing a high percentage of oil, it is believed that the finely ground cherry hull operates as a carrier and that the oil may be smeared around the surface thereof or sufficiently adsorbed to result in a dry cherry pit flour.

It is possible to grind the entire cherry pit to form a flour. This would result in greater quantities, and the need to do so will depend upon the relative demand or market. In any event, it is desirable, that the edible flour contain about 10 percent fat and 10 percent protein. This is accomplished by having a ratio of 40 percent cherry kernel and 60 percent cherry hull. It has been found that the quantities may be adjusted so that the percentages of hull and kernel are about 50—50. This results in an advantageously rich cherry pit flour, yet one that is still dry. To make a usable, edible cherry pit flour, the flour should pass a No. 120 mesh or sieve; however, I have found it preferable if the resulting flour be able to pass a No. 200 mesh since the product is then even more refined.

The cherry kernel has a distinctive taste or flavor, and may be likened to almond flavoring. By the substitution of cherry pit flour into a food product, an almond flavoring is imparted thereto. Because the flour is quite a fine material, it is generally equally dispersed throughout the product and imparts a uniform flavoring thereto. Flavoring a food product by use of cherry pit flour does not have the disadvantage of evaporation as do some artificial flavorings.

For a better understanding of the invention and the manner of utilizing it, I give the following examples of making food products. The cherry pit flour, having about a 40-60 ratio and prepared in the manner described above, may be mixed with ordinary cereal flour in whatever proportions are desired. In any selected recipe, the cherry pit flour can be used to replace a generally equal amount of the cereal flour. In bread, I have found that from 6 to 30 percent of the total flour may be cherry flour. A recipe utilizing about 14% of cherry pit flour gives a bread having a good "light" almond taste. Utilizing about 20 to 25 percent of cherry nut flour gives the coloration and taste potency approximating a light rye bread, but with an almond taste; while 30 percent of cherry nut flour gives a color and taste consistency of dark rye bread. For pancakes, about one-third of the cherry nut flour gives excellent results; while about 50 percent of the cherry nut flour may be utilized for cookies and waffles.

Although the above proportions are suggested, it is evident that the proportions might be smaller or larger as desired. There is so great a taste range among people as to what is palatable or desired, that the precise proportioning and addition of other ingredients must be left to the art of the cook according to the particular result which is desired to produce. In general, a materially larger proportion of cherry pit flour may be used if the ultimate form is not raised, like bread, but is to be generally more solid, as cookies.

As another product of the above-described process, the harder portions of the hull may be utilized as an industrial abrasive or grit. For example, the hulls may be utilized as grit for deflashing purposes. The cherry hulls, as a whole, are somewhat soft and thus give an inferior abrasive. The harder portion of the cherry hull, however, is acceptable for this use. If desired, an even harder grit can be obtained by grinding the hard hull portions and separating the resulting product into larger and smaller sizes. The larger sizes will be the hardest of the hard shell portions and give a particularly advantageous abrasive. The smaller portions may be utilized as industrial flour. The whole kernel may be used in toppings or ground into a paste for enhancing flavoring. If desired, the oil content of the cherry kernel may be extracted for use as another by-product.

The herein description of the invention has been by way of illustration and not limitation, and the invention should not be limited except as required by the scope of the appended claims.

I claim:

1. A substantially dry cherry pit flour for use in comestibles for human consumption, consisting of a mixture of 40–50 percent finely ground cherry hulls with the remainder of said mixture being cherry kernels containing oil, the amount of cherry hulls being sufficient to disperse the oil in the cherry kernels and form a dry cherry pit flour, and the cherry pit flour having about 10 percent fat and 10 percent protein.

* * * * *